HARLAN D. FOWLER
INVENTOR.
Huebner, Beehler, Worrel & Herzig
BY

ATTORNEYS.

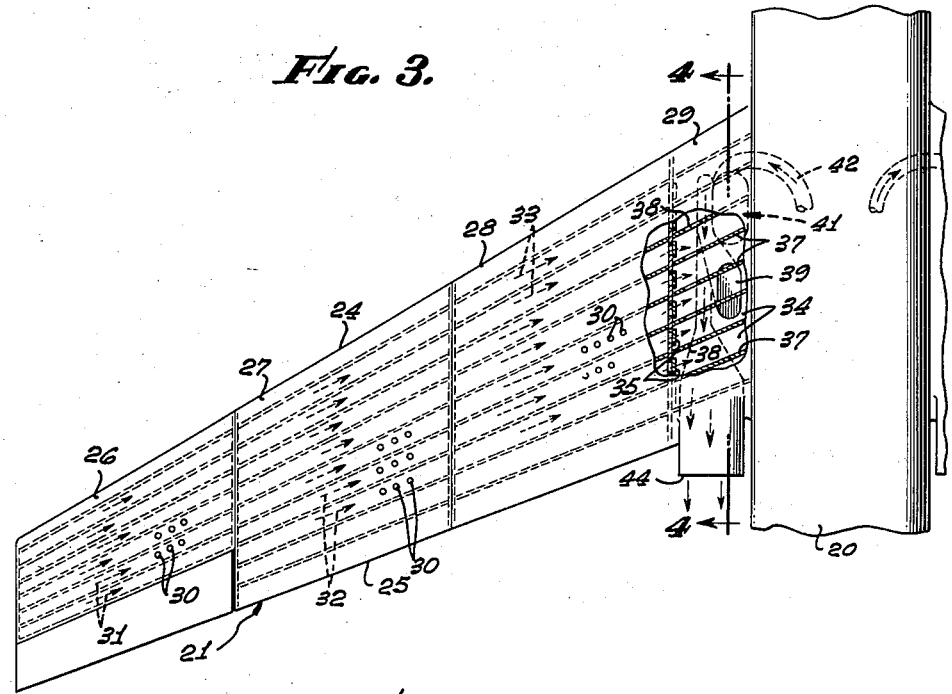
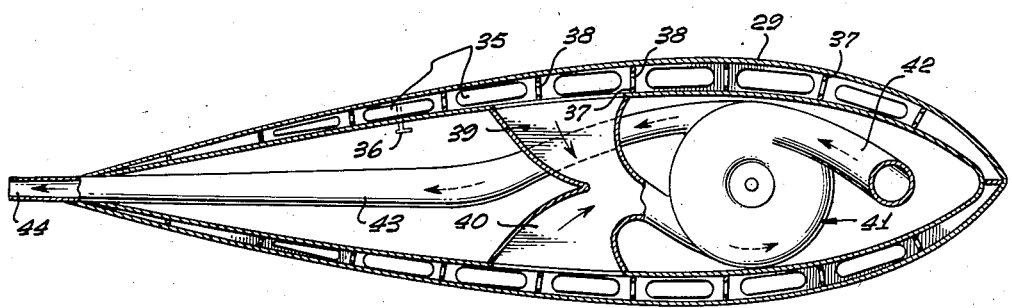
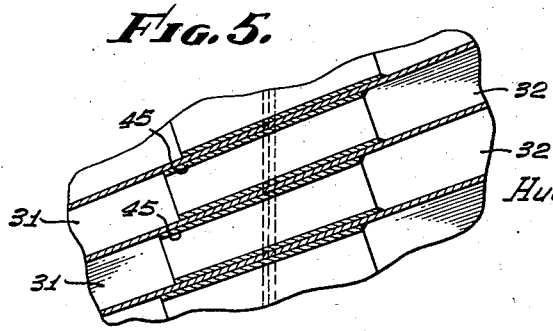

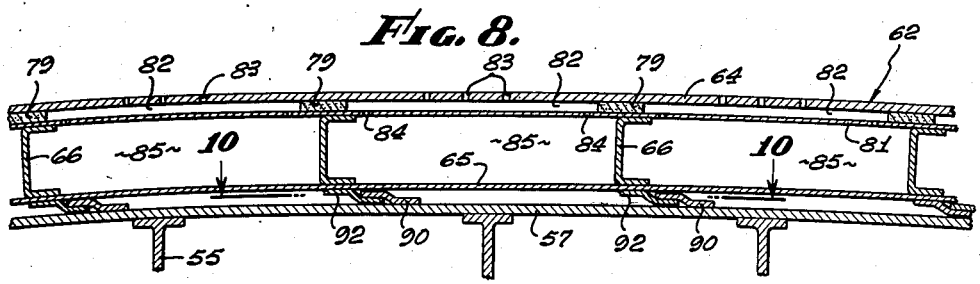
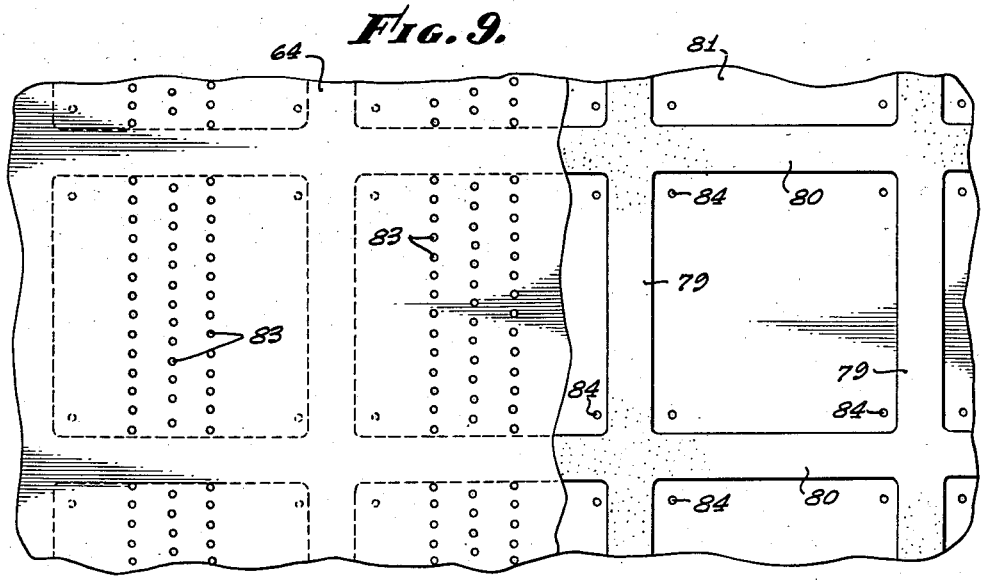
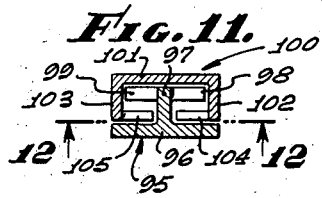
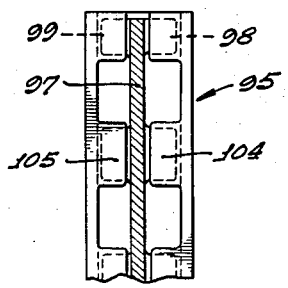
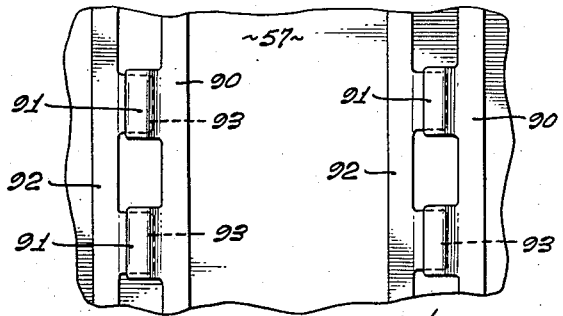

United States Patent Office 2,833,492
Patented May 6, 1958

2,833,492

BOUNDARY LAYER CONTROL SYSTEM WITH AERODYNAMIC GLOVE

Harlan D. Fowler, Washington, D. C.

Application February 7, 1955, Serial No. 486,370

16 Claims. (Cl. 244—40)

The invention relates to airplanes and has particular reference to control of the boundary layer of air immediately adjacent a surface passing through the atmosphere at a high rate of speed in order to reduce turbulence, thereby to improve the efficiency of the airplane under certain circumstances.

More particularly the invention relates to application of a secondary air contacting surface to such portions of an airplane as wings, fuselage, and tail section, the air contacting surface being of such smooth and polished construction that it is capable of absorbing and disposing of air immediately adjacent the air contacting surface, thereby to reduce or in any event to minimize turbulence.

It has been discovered by wind tunnel tests and other experimental tests that air passing over the exterior surface of an airplane follows a well-defined path which is determined by the shape of the airplane and also the speed at which the airplane is traveling. When such object is an airfoil or, in other words, the wing of an airplane, the leading edge of the wing separates the air causing it to follow paths over and under the wing, thence passing to the trailing edge. As the speed of the airfoil through the air is increased, the air shows a tendency to increased turbulence as it follows the upper and lower airfoil surfaces. The turbulence is greatest at the boundary between the airfoil surface and the air immediately adjacent thereto, the term "boundary layer" having been adapted to define the air here made reference to. While it is true that turbulence can be reduced at high speeds by making airfoil sections thinner and smoother, there is a limit to the reduction in thickness which can be effected inasmuch as the airfoil must be strong enough for its purpose, must have a certain amount of rigidity, and must provide a certain minimum amount of lift. As higher and higher speeds are contemplated, more drastic turbulent conditions are experienced in the boundary layer and hence attempts have been made at boundary layer control. It has been learned that the turbulence can be reduced and control of the boundary layer effected by providing bleed holes at the surface of greatest turbulence so that a certain amount of air can be sucked away from the outer surface of the airfoil sufficient to eliminate or in any event minimize turbulence. These discoveries have resulted in being able to increase the lift of the airfoil and conversely to reduce the profile drag, as these terms are known in aerodynamics, to a very appreciable degree.

Since airfoil sections and the design of air frames differ, each different design necessitates a different handling of the boundary layer of air. In fact, an airfoil, for example, so designed that it can bleed off the turbulent boundary layer needs to be designed to a different contour, size and specification than one not intended for that purpose. Also the bleeding off of turbulent boundary layer on a fuselage or engine nacelle poses another problem of design. Hence to redesign an airplane of an existing specification, to take advantage of boundary layer control and the attendant experimentation needed to arrive at the correct specification, becomes prohibitive from a practical point of view.

It is therefore among the objects of the invention to provide a new and improved appurtenance capable of being applied to wings and other portions of an airplane or other airborne object whereby the control of the boundary layer of air at high speeds of the object through the atmosphere can be effected without the necessity of redesigning the air frame itself.

Another object of the invention is to provide a new and improved aerodynamic glove which can be applied over existing portions of an air frame in sections, the glove being of such character that it can be removed and either revised to meet new conditions or replaced by a glove of different design in order to establish in the air frame a different set of conditions wherein by controlling the boundary layer the lift on the air frame may be increased and the profile drag substantially minimized.

Still another object of the invention is to provide a new and improved aerodynamic glove structure whereby the glove is adapted to be constructed in sections applicable one by one to different portions of the air frame and particularly the wings or airfoils, the glove being so designed as to provide a selective porous exterior communicating with well-defined passages and ducts in the interior, the passages and ducts being so directed that air can be drawn through the glove at any desired rate, thereafter to be exhausted or wherein the flow of air can be changed so as to be emitted from certain portions of the glove and particularly the leading edge where such variation in treatment of the boundary layer will improve the performance of the selected portion of the air frame.

Still further among the objects of the invention is to provide a new and improved control for boundary layer of air frame sections such as the wing of an airplane whereby a sectional glove may be employed so attached to the air frame that the normal and the increased effect of lift absorbed by the glove can be properly transferred to the appropriate structural portion of the air frame.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 3 is a diagrammatic plan view of a portion of a typical high speed airplane showing glove sections applied to the wing and indicating by arrows the course of air bled from the surfaces of the glove to a suction pump from which it is exhausted in an aft direction.

Figure 4 is a cross-sectional view on the line 4—4 of Figure 1 showing the location of passages and ducts for the transportation of air.

Figure 5 is a fragmentary sectional view showing the junction between adjacent glove sections and interconnection of passages.

Figure 8 is a fragmentary cross-sectional view showing details of the glove construction on one surface of the wing.

Figure 9 is a plan view partially broken away to show the structure of the glove.

Figure 10 is a fragmentary plan view taken on the line 10—10 of Figure 8 showing the means of attaching the glove to the wing.

Figure 11 is a cross-sectional view of a modified attachment means.

Figure 12 is a longitudinal view taken on the line 12—12 of Figure 11.

Figure 1:
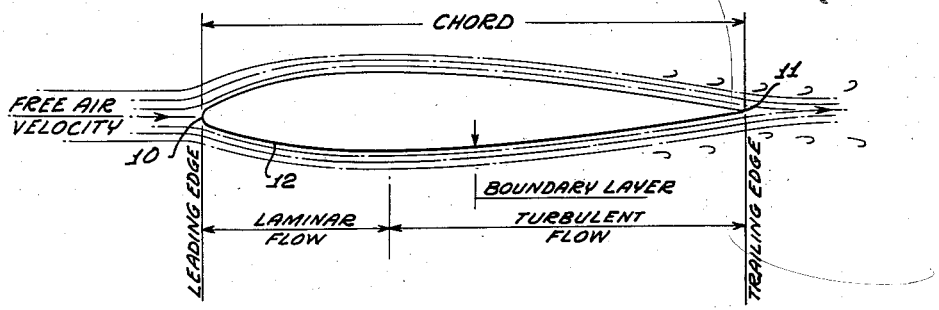
Figure 1 is a schematic representation of a cross-section of an airfoil or wing of an airplane showing the atmospheric conditions set up by the passage of air over the wing.
Figure 2:
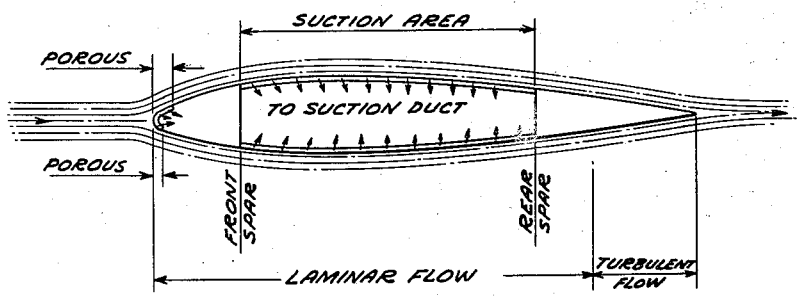
Figure 2 is a diagrammatic view similar to Figure 1 but illustrating the manner in which atmospheric conditions in air passing over the wing are changed by the application of boundary layer control.
Figure 6:
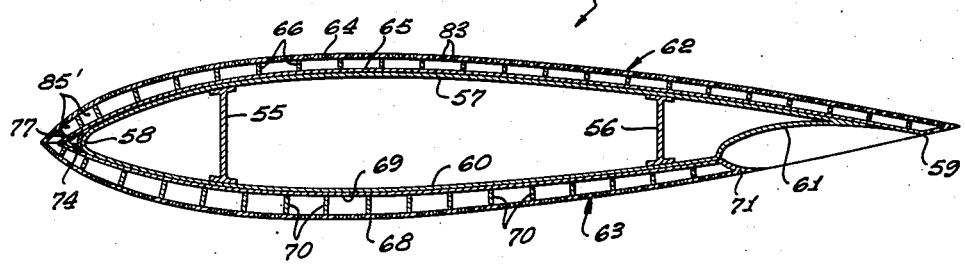
Figure 6 is an enlarged cross-sectional view of the wing of an airplane showing the application of an aerodynamic glove thereto.
Figure 7:
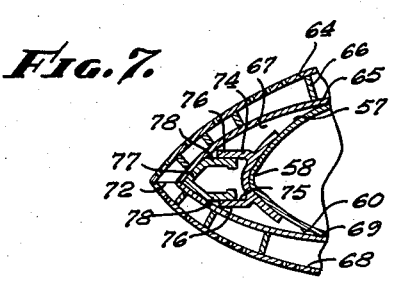
Figure 7 is an enlarged cross-sectional view showing the structure of the glove at the leading edge of the wing.

To understand the character of the subject matter invention attention is directed to the schematic study of a wing or airfoil section passing through the atmosphere. Figure 1 illustrates in cross-section a characteristic wing of an airplane presenting a leading edge 10 to the atmosphere and having a trailing edge 11. A lower wing surface 12 of curved contour extends around the bottom of the wing from the leading edge to the trailing edge and an upper wing surface 13 extends in a somewhat similarly curved direction over the top of the wing from the leading edge to the trailing edge. A "chord" of the wing section is indicated as the over-all distance between leading edge and trailing edge.

As a wing section of this general description advances through the atmosphere, the leading edge 10 knifes through the air and separates it into portions traveling respectively over the lower and upper surfaces of the wing section. The effect, of course, is that of air impinging upon the wing section and traveling over it at an established rate of speed.

The forward portion of the wing section where it progressively increases in depth is indicated as the area of laminar flow or area of low profile drag. That portion of the wing section which progressively decreases is indicated as the area of turbulent flow or high profile drag. As the air passes beyond the trailing edge, it will exist in a somewhat turbulent state indicated as the wake. Where relatively low velocity of air over the wing section is experienced the amount of turbulent flow will not be sufficiently great to materially affect the profile drag on the lower and upper surfaces. When the relative velocity of air increases materially, turbulence over the upper and lower surfaces greatly increases profile drag. This undesirable effect is most prevalent over the mid-portion of the wing indicated as the suction area. It has been taught that turbulence can be reduced by making the mid-portion of the wing somewhat porous so that the boundary layer of air can enter the wing through its skin and thereafter be drawn off. Moreover, inducing a flow of air in the described direction extends the area of laminar flow from the fore portion of the wing section to a point substantially near the trailing edge, thereby reducing the area of turbulent flow to an area not far forward from the trailing edge. This condition is further improved by rendering the area adjacent the leading edge porous to accept some inflow of air to be ultimately sucked away and thereby prevent premature loss of lift or even to increase it.

To show the application of this principle a portion of a conventional high speed airplane illustrated diagrammatically in Figure 3 is shown as comprising a fuselage 20 having a swept back wing 21 extending laterally therefrom. The power plant (not shown) may be assumed to be a turbo jet engine. The leading edge of the wing is indicated by the reference character 24 and the trailing edge by the reference character 25.

To facilitate boundary layer control over the wing section in a practical way, that is to say, control over the layer of air nearest the wing, glove sections 26, 27, 28, 29 are indicated. Glove sections 26, 27 and 28 should be understood as being provided with bleed holes 30, a few only of which are shown in Figure 3 for the purpose of this preliminary description. The bleed holes extend through the outer portion of the glove sections whereby boundary layer air can be drawn into ducts indicated by the laterally directed arrows 31, 32 and 33 in the respective glove sections. The ducts in adjacent glove sections are interconnected and extend transversely inwardly from the tip of the wing toward the fuselage.

Glove sections 26, 27 and 28 may be considered as sections extending over both upper and lower surfaces of the particular portion of the wing to which they are applied. Glove section 29 is substantially narrower and may or may not be imperforate. This glove section may be considered as a collecting chamber for all of the air drawn through the ducts in the other glove sections. Each of the ducts 33 through which air flows from the ducts 32 and 31 opens into a duct 34 in the glove section 29. Valves 35 are shown in a position whereby they can control the flow of air from each of the ducts 33 into the collecting chamber represented by the aggregation of ducts 34. These valves may be of the butterfly or other suitable type whereby a control 36 extends into the interior of the wing where suitable connections, not shown, can be made to the cockpit.

Although the ducts 34 are separated by webs 37, the presence of the webs is essential only for the purpose of supporting the outer portion of the glove. Therefore passages 38 extend through the webs so that all air drawn from the ducts 33, whether on the upper or lower side of the wing, can be sucked into suitable intake passages 39 and 40 of a suction pump 41.

In the embodiment chosen for the purpose of illustration the suction pump may be a turbine pump operated by an air bleed 42 from the turbine power plant of the airplane. Air drawn into the suction pump is passed through an air exhaust passage 43 rearwardly of the glove section 29 and blown out into the atmosphere beyond the trailing edge of the wing through an outlet 44.

It being essential that a positive control be had over all of the air sucked into the ducts 31, 32 and 33, means is provided to seal the connections between ducts in one glove section with the adjoining section. A positive means is illustrated in Figure 5 wherein sleeves 45 having substantially the same shape as the ducts 32 are sealed at 46 in the ducts by welding or plastic, depending upon the material. The sleeves extend outwardly beyond the end edge of the ducts and are adapted for insertion into corresponding ducts 31 in the next adjacent outer glove section. The extension of each sleeve into the duct 31 can be tightened by some adhesive or other appropriate seal, if need be.

A typical example of an aerodynamic glove is shown in greater detail in Figures 6 through 9, inclusive, which may be presumed to illustrate the construction, for example, of the glove section 27. This will differ from the other glove sections only with respect to length and thickness needed to accommodate respectively different portions of the wing 21.

In the particular configuration of the invention chosen for the purpose of illustration a typical cross-section of an airplane wing is depicted. This may be properly referred to as the basic wing. In accordance with conventional construction a front spar 55 and a rear spar 56 serve to separate and support an upper portion 57 which extends from a leading edge 58 to a trailing edge 59. A lower portion 60 of the basic wing extends from the leading edge rearwardly to an upwardly extending area 61 before joining the trailing edge 59, thereby to provide space for a flap.

The glove 27 heretofore referred to may be constructed so that each section has an upper assembly 62 and a lower assembly 63. In the chosen embodiment the upper assembly 62 consists of an outer skin 64 and an inner skin 65, the outer and inner skin being separated by ribs 66. The ribs are variable in height separating the skins one from another by variable distances throughout the chord. The inner skin 65 follows and hugs the contour of the upper portion of the basic wing.

The lower assembly 63 is constructed somewhat similar to the upper assembly in that it consists of an outer skin 68, an inner skin 69, and ribs 70 separating the skin. The lower assembly varies in thickness from a portion aft of the leading edge, diminishing in thickness therefrom respectively toward the trailing edge and toward the leading edge. The inner skin 69 also conforms snugly to the lower portion of the basic wing throughout substantially the entire area and both skins are formed at the aft end 71 so as to accommodate the junction with the area 61 provided for a flap.

At the forward ends of the upper and lower assemblies these assemblies join along a line 72 which is preferably sealed at this point.

Because of the excessively high aerodynamic pressure at the leading edge of the glove section, some form of reinforcement for this portion is recommended. In the chosen embodiment the reinforcement consists of a channel member 74 which provides a channel recess extending along the leading edge 58 of the basic wing. Legs 76 of the channel member define the recess. Slidably received in the channel recess is a somewhat U-shaped section 77 having legs 78 on each side separated one from another by a distance such that the outer surfaces of the legs slide within the inner surfaces of the legs 76 forming the channel recess 75. Under those circumstances where the glove assemblies are of somewhat resilient material should the forward edge of the glove assemblies be depressed for any reason, they are permitted a slight deflection though resisted by the U-shaped section which may slide to the bottom of the channel recess 75, at which point it provides an unresisting brace or support preventing further deflection of the glove assemblies.

The construction of the glove is shown in greater detail in Figures 8 and 9. Immediately within the outer skin 64 of the glove is a gasket formed by a series of longitudinal elements 79 intersecting transverse elements 80. The gasket material may be of some acceptable plastic or laminated fibre-glass about 1/16 inch in thickness with the elements spaced so that the square areas between them enclose several square inches of space.

Inside the gasket is a thin inner sheet which may be identified as a plenum sheet or membrane 81 forming together with the elements of the gasket and the outer skin a series of plenum spaces 82. The outer skin is provided with a series of appropriately located holes or slots 83 which communicate between the exterior of the glove and the plenum spaces. In the plenum sheet are apertures 84, lesser in number than the holes 83, the apertures 84 communicating between the plenum spaces 82 and air passages 85 which are defined by the ribs 66, the inner skin 65 and the plenum sheet 81.

It has been found that the entire glove structure may be constructed of laminated fibreglass. The holes 83 in the outer skin 64 are spaced and their number determined by theoretical calculation determined by the shape of the airfoil, the boundary layer Reynolds number based on the boundary layer thickness, as well as on the momentum thickness established by subsequent flight tests. These rows are spaced in accordance with the basic laws which require a stable laminar boundary layer from the leading edge to as far back as the trailing edge. If minimum profile drag is to be obtained, perforations may comprise several rows of closely spaced holes and these rows spaced at designated distances along the chord to a location near the trailing edge. The area occupied is dependent upon the amount of air to be sucked inwardly through the outer surface. Moreover, it is known that rain, condensation of fog, or dust will clog the pores of sintered material and also discreet holes or slots, thereby to prevent efficient suction. Consequently the holes or slots should be not less than about .020 inch in diameter to permit moisture or dust to easily flow through without clogging.

To prevent excessive velocity flow through the outer skin 64 to the air passages 85 the apertures 84 in the plenum sheet are substantially fewer in number than the holes or slots 83 and scattered throughout each plenum space, thereby to direct air flow through the plenum sheet to the air passage 85 at low velocity. The air passage 85, which may be designated as an air duct, is an impervious passage except for the apertures 84 in order to direct the inflowing air towards an appropriate suction pump which may be located at the root portion of the wing or in the fuselage. These air passages and the gasket spaces as well must be sealed so that the suction flow will not tend to outflow or reverse itself at some other portion of the perforated outer skin inasmuch as that would tend to create turbulence and thus increase the profile drag beyond that of the basic wing not fitted with the boundary layer control glove. The provision of the plenum sheet under the outer skin enables increasing the permeability of a given plenum area by inserting a drill through a selected outer skin perforated hole and drilling an additional hole in the plenum sheet, thus eliminating the need for removing the glove in case the flow must be altered.

The materials that may be used in the actual construction of the glove in addition to laminated fibreglass are aluminum or magnesium alloy sheets, or even steel with rubber moldings employed at appropriate locations. Combinations of these materials are equally effective. Some flexibility is desirable so that when the glove is installed on a wing it will possess all the requirements needed. A smooth and highly polished external surface is mandatory. Moreover, the location of the holes and perforations can be made without reference to the internal construction of the wing or the economical location of the spars within the wing. Designed and constructed as herein described, glove sections can be removed and replaced by redesigned sections or altered to accommodate different conditions.

To facilitate attachment and removal of glove sections to the wing of the airplane a series of scalloped flanged strips 90 are attached lengthwise of the wing to the outer surface 57. The attachment may be by some appropriate adhesive, by adhesive strips or appropriate bolts or rivets. Elements 91 extend outwardly from the strip spaced from the outer surface to which the strip is attached and form clips. Complementary strips 92 are located on the inner skin of the glove, these likewise being provided with spaced elements 93 forming clips of about the same length as the elements 91. In each instance the elements are spaced apart by distances sufficient to have the complementary elements inserted therebetween and then slid lengthwise to engage the clips 91 and 93 with each other, thereby to fasten the glove sections upon the wing. The clips furthermore provide means for transmitting the distributed lifting force over the glove to the wing structure.

Certain circumstances may arise where the aerodynamic lift over the glove is so great that the flanged strips are of insufficient strength to transmit the load. Under such circumstances an attachment as illustrated in Figures 11 and 12 may be employed. As there shown a two-sided strip 95 having a base 96 supports an upstanding central flange 97 from which clips 98 and 99 extend from opposite sides parallel to the base. These clips are spaced one from another and from the base, the base being attached to the wing of the airplane in the same fashion as the strips 90. Channel strips 100 may be attached to the glove sections, these channel strips having a web 101 and legs 102 and 103. At the ends of the legs clips 104 and 105 extend inwardly in positions parallel to the clips 98 and 99. With the arrangement thus described the channel strips can be placed over the two-sided strips with the clips fitting in the spaces between clips on the opposite member in each case and then moved lengthwise a short distance to engage the clips, one meeting the other.

In the application of gloves and glove sections of the type herein described to wings of airplanes in particular or in other forms to different portions of the air frame, it is desirable to allow a certain amount of shifting of the glove relative to the wing surface so that the glove will not be subjected to undue deflections or wrinkling arising from the bending and twisting of the wing, for example, under flight conditions. This accounts for the provision of interlocking strips which are flexibly secured in their locked positions. Due to this type of connection the required smoothness of the suction surface of the glove is not disturbed and the degree of porosity along the entire exterior surface of the glove is maintained at its carefully designed rate of flow under all circumstances. The degree of slippage between the glove sections and the wing will be determined by the depth of the strips and the length of the clips protruding therefrom which can be designed to transfer the aerodynamic lift force over the glove into the wing structure under all circumstances.

It has been found under certain conditions that it may be desirable to reverse the flow of air through the glove particularly along the leading edge. To make that possible it is desirable to have certain of the air passages, indicated by the reference character 85', connected to a separate common duct and hence to a proper pumping device. Suitable valves of conventional construction can be employed to redirect the flow of air so that air can be forced through the air passages 85' and outwardly through the holes in the outer skin of the glove adjacent the leading edge, even while suction is being applied to the remaining air passages. Objects such as shattered flies, dust, snow or rain, and other particles may impair the proper functioning of the inflow air especially along the leading edge. After such objectionable particles have been removed by the reverse air flow, suction can then be applied to the holes at the leading edge as well as over the remaining portions of the glove by proper manipulation of valves in the exhaust ducts to the pumps so that normal boundary layer control can continue.

Control of the boundary layer of air by means of the glove construction herein described is particularly effective at air speeds wherein the Mach number is approximately 0.8 (from 600 M. P. H. at sea level to over 500 M. P. H. at 50,000 feet). When the slots 83 are approximately .020 inch or larger in diameter, suction applied to them in the arrangement herein illustrated and described will permit local inflow velocity of about 2% of the airplane velocity and laminar flow can be maintained. The glove thus described is extremely valuable, first, in determining a proper amount of suction to produce laminar flow without resorting to redesign of the airfoil or other portions of the airplane, and thereafter to increase the lift and decrease the profile drag to an extent which very greatly extends the range of operation of an airplane so equipped.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In an aircraft having full functioning smooth air-contacting surfaces a removable glove structure fitting snugly over said surfaces, said glove structure comprising an outer porous layer of material and an inner impervious layer of material and means separating said layers of materials whereby to form an air passage means therebetween, duct means communicating with said air passage means and connections between said inner layer and said aircraft.

2. In an aircraft having full functioning smooth air-contacting surfaces a removable glove structure fitting snugly over said surfaces, said glove structure comprising an outer porous layer of material and an inner impervious layer of material and means separating said layers of materials whereby to form an air passage means therebetween, and duct means having a discharge port directed rearwardly of the aircraft and a mechanical suction means in said duct means adapted to pass air from the porous layer through said discharge port, said inner layer having a contour substantially conforming to the contour of the surface adjacent thereto and connections on the inner layer connecting the glove structure to said surface.

3. In combination with an airborne body having full functioning smooth air-contracting surfaces and adapted to traverse the atmosphere, a removable glove overlying the body and conforming to the contour of the air-contacting surfaces thereof, said glove comprising an inner skin and an outer skin and spacing elements between the skins forming a plurality of passages intermediate said skins, a plurality of discrete holes extending over selected areas of the outer skin communicating with passages therebeneath, ducts interconnecting said passages, air-moving means communicating with said ducts and with the atmosphere and adapted to draw air through said discrete holes and exhaust said air to the atmosphere.

4. In combination with an airborne body having full functioning smooth air-contacting surfaces and adapted to traverse the atmosphere, a glove overlying the body, said glove comprising an inner skin and an outer skin and spacing means forming a plurality of passages intermediate said skins, and removable connections between the inner skin and said surfaces, a plurality of discrete holes extending over selected areas of the outer skin, an intermediate membrane between the outer skin and said passages and spaced from said outer skin forming an intermediate chamber therebetween, means forming passages of lesser aggregate flow capacity through said membrane and communicating with said passages, ducts interconnecting said passages, and an air-moving means communicating with said ducts and with the atmosphere and adapted to draw air through said discrete holes and exhaust said air to the atmosphere.

5. In combination with a full functioning airborne body adapted to traverse the atmosphere at high speeds whereby lift and drag is exerted by the atmosphere on the body accompanied by varying degrees and areas of turbulence, a glove overlying the body, said glove comprising sections conforming to the exterior contour of corresponding sections of the body, an inner skin and an outer skin for each said glove section and spacing elements between the skins and forming a plurality of passages intermediate said skins, and connections removably connecting each glove section to the corresponding section of the body, a plurality of discrete holes extending over selected areas of the outer skin communicating with the passages therebeneath, ducts forming passage means interconnecting said passages, an exhaust pump communicating with said ducts and with the atmosphere adapted to draw air through said discrete holes and exhaust said air to the atmosphere and separable passage elements between passages of adjacent sections providing for passage of air from one section to another.

6. In combination with a full functioning airborne body adapted to traverse the atmosphere at high speeds whereby lift and drag is exerted by the atmosphere on the body accompanied by varying degrees and areas of turbulence, a glove overlying the body, said glove comprising sections conforming to the exterior contour of corresponding sections of the body, an inner skin and an outer skin for each said glove section and spacing elements between the skins and forming a plurality of passages intermediate said skins, a plurality of discrete holes extending over selected areas of the outer skin communicating with the passages therebeneath, ducts forming passage means interconnecting said passages, an exhaust pump communicating with said ducts and with the atmosphere adapted to draw air through said discrete holes and exhaust said air to the atmosphere, and slidably interlocking clips respectively on adjacent portions of the glove sections and the airborne body whereby to releasably secure the glove sections to the body.

7. In combination with a full functioning airborne body having smooth surfaced laterally extending airfoils, auxiliary removable means for controlling the boundary layer of air flowing over said airfoils comprising gloves having inside contours substantially in conformance with respective sections of the airfoils, each of said gloves comprising an imperforate inner skin mounted on the exterior of a respective airfoil section, an outer skin and an intermediate membrane, spacers between the outer skin and the membrane and between the membrane and the inner skin, sets of holes extending through the outer skin and sets of holes extending through the inner membrane whereby to provide a passage for air adjacent the outer skin to a location between the membrane and the inner skin, and means forming out-flow ducts communicating with the atmosphere whereby to lead off air drawn through said glove.

8. In combination with a full functioning airborne body having laterally extending smooth wings, means for controlling the boundary layer of air flowing over said wings comprising a separate glove section for each wing having an inside contour substantially in conformance with the outside surface of the wing, means for attaching said glove to and removing said glove section from the respective airfoil, said glove section comprising an imperforate inner skin mounted on the exterior of the wing and an outer skin, spacers between the outer and inner skin whereby to secure the skins in spaced relation and to provide air passages therebetween, said outer skin comprising an outer layer having a plurality of holes therethrough over said air passageways, baffle means at inner ends of the holes in said outer layer whereby to retard the velocity of air passing therethrough, said glove section having out-flow ducts communicating with said air passages whereby to lead off air drawn through said air passages.

9. In combination with a full functioning airborne body having laterally extending airfoils, means for controlling the boundary layer of air flowing over said airfoils comprising a series of glove sections separate from the airfoil construction covering each airfoil, each said glove section having an inside contour substantially in conformance with respective sections of the airfoil, each said glove section comprising an imperforate inner skin secured to the exterior of the air foil, and an outer skin, a plurality of ribs extending substantially lengthwise of the airfoil secured respectively to the outer and inner skin whereby to mount the skins in spaced relation and to provide air passages therebetween, said outer skin comprising an outer layer having a plurality of discrete holes therethrough over said air passageways, a membrane layer beneath said outer layer and spacing means adjacent said ribs forming a plurality of pockets between said membrane layer and said outer layer, said membrane layer having a plurality of apertures therethrough spaced laterally relative to the holes in the outer layer and having a lesser flow capacity than said holes, each said glove section having out-flow ducts communicating with said air passages whereby to lead off air drawn through said air passages.

10. In combination with a full functioning airborne body having laterally extending airfoils comprising upper and lower exterior airfoil surfaces terminating in a leading edge and a trailing edge, a boundary layer control glove for each airfoil separate from the airfoil and comprising inner and outer skins and a plurality of spacers between said skins whereby to secure said skins together in spaced relation, said inner skin having a substantial conformance to the contour of the respective airfoil at the area occupied by the glove, and means providing an attachment of said glove on the respective airfoil comprising a plurality of clips secured to the inner skin and a plurality of complementary clips secured to the upper and lower surfaces of the airfoil, said clips respectively on the inner skin and the airfoil being adapted to slide relative to each other and to underlie each other in positions wherein pressure on the glove is transferred through the clips to the airfoil.

11. In combination with a full functioning airborne body having a laterally extending airfoil comprising upper and lower exterior airfoil surfaces terminating in a leading edge and a trailing edge, a boundary layer control glove comprising inner and outer skins on each side of the airfoil and a plurality of ribs secured in spaced relation between said skins in a direction lengthwise of the airfoil whereby to secure said skins together in spaced relation, said inner skin having a substantial conformance to the contour of the airfoil at the area occupied by the glove, and means providing an attachment of said glove on the airfoil comprising a plurality of strips secured to the face of the inner skin nearest the airfoil and adjacent the ribs and having a series of uniformly spaced clips extending therefrom over the surface of the inner skin, and a plurality of complementary strips secured to the outer surfaces of the airfoil each having a series of spaced clips parallel to said first clips, said clips respectively on the inner skin and on the airfoil being adapted for insertion into spaces between respectively opposite clips and for movement longitudinally into and out of interlocking relationship.

12. In combination with a full functioning airborne body having laterally extending airfoils each comprising upper and lower exterior airfoil surfaces terminating in a leading edge and a trailing edge, a boundary layer control glove for each airfoil comprising a plurality of sections each having inner and outer skins and a plurality of ribs secured in spaced relation between said skins in a direction lengthwise of the airfoil whereby to secure said skins together in spaced relation, said inner skin of each section having a substantial conformance with the contour of the airfoil at the area occupied by the respective section, and means providing an attachment for each section on the airfoil comprising a first set of clips secured to the inner skin and a second set of complementary clips secured to the outer surfaces of the airfoil, each of said sets of clips being inserted into spaces between the clips of the other set and the structure to which the clips of said other set are attached whereby the glove sections are removably anchored on the airfoil and air pressure on the glove is transferred to the airfoil.

13. In combination with a full functioning airborne body having laterally extending airfoils each comprising upper and lower exterior airfoil surfaces terminating in a leading edge and a trailing edge, a boundary layer control glove for each airfoil comprising inner and outer skin sections and a plurality of spacers secured in spaced relation between said skin sections whereby to secure said skin sections together and to provide air passageways therebetween, said outer skin section having holes extending from the atmosphere into the passageways, and means securing the glove to the airfoil comprising a series of clips respectively on the inner skin section and the outer surfaces of the airfoil, and a separate connection comprising complementary parts located respectively at the leading edge of the airfoil and at a corresponding portion of the inside of the glove and extending parallel to said leading edge, said parts having a limited laterally sliding relation and a laterally abutting relation at the end of said sliding relation and adapted to support the forward portion of the glove upon deflection thereof upon said leading edge of the airfoil.

14. In combination with a full functioning airborne body having laterally extending airfoils each comprising upper and lower exterior airfoil surfaces terminating in a leading edge and a trailing edge, a boundary layer control glove comprising inner and outer skin sections and a plurality of ribs secured in spaced relation between said skins in a direction lengthwise of the airfoil whereby to secure said skin sections together and to provide air passageways therebetween, said outer skin section having holes extending from the atmosphere into the passageways, out-flow ducts communicating respectively with passages at suction areas of the airfoil and with passages at said leading edge, and means securing the glove to the airfoil comprising a series of interlocking pairs of clips respectively on the inner skin section and the outer surfaces of the airfoil, and a pressure absorbing connection at the leading edge comprising complementary parts extending longitudinally of the airfoil, said parts being located one at the leading edge of the airfoil and the other at the corresponding portion of the inside of the glove, one of said parts having a channel recess therein and the other of said parts having a projection slidably received in said channel recess and adapted upon compression to support the forward portion of the glove on said leading edge of the airfoil.

15. In combination with a full functioning airborne body adapted to traverse the atmosphere at high speeds whereby lift and drag is exerted by atmosphere on the body accompanied by varying degrees and areas of turbulence, a series of glove sections overlying the body in close contact each section with the next adjacent section, said glove sections having a shape and configuration conforming to the exterior contour of corresponding sections of the body, an inner skin and an outer skin for each glove section and spacing elements between the skins and forming a plurality of passages intermediate the skin, a plurality of discrete holes extending over selected areas of the outer skin communicating with the passages therebeneath, ducts forming passage means interconnecting the passages and comprising sleeves in one of a pair of adjacent glove sections sealed therein and extending outwardly into corresponding ducts of the next adjacent glove section, and an exhausting means communicating with said passage means adapted to exhaust air drawn through said holes to the atmosphere.

16. In an aircraft having full functioning smooth air-contacting surfaces a removable glove structure fitting snugly over said surfaces, said glove structure comprising an outer porous layer of material and an inner impervious layer of material and means separating said layers of materials whereby to form an air passage means therebetween, and duct means having a discharge port directed rearwardly of the aircraft and a mechanical suction means in said duct means adapted to pass air from the porous layer through said discharge port, said inner layer having a contour generally in conformance with the contour of the surface adjacent thereto and said outer layer having an independent contour at a variance with respect to the contour of the inner layer, and connections on the inner layer connecting the glove structure to said surface.

References Cited in the file of this patent

UNITED STATES PATENTS

| 2,643,832 | Thwaites | Jue 30, 1952 |

FOREIGN PATENTS

| 479,598 | Great Britain | Feb. 7, 1938 |
| 1,050,603 | France | Sept. 2, 1953 |

(Corresponding Great Britain 718,421, Nov. 17, 1954.)